United States Patent [19]

Schmerling

[11] 3,758,617
[45] Sept. 11, 1973

[54] HALOGEN SUBSTITUTED POLYCYCLIC HYDROCARBONS

[75] Inventor: Louis Schmerling, Riverside, Ill.

[73] Assignee: Universal Oil Products Company, Des Plaines, Ill.

[22] Filed: Aug. 27, 1970

[21] Appl. No.: 67,611

[52] U.S. Cl. .......................... 260/648 C, 260/648 F
[51] Int. Cl. ....................... C07c 17/00, C07c 23/46
[58] Field of Search .................... 260/648 C, 648 R, 260/648 F

[56] References Cited
UNITED STATES PATENTS
3,092,641  6/1963  Leon ............................. 260/648 C Primary Examiner—Daniel D. Horwitz
Attorney—James R. Hoatson, Jr. and Raymond H. Nelson

[57] ABSTRACT

Novel compositions of matter comprising halogen substituted polycyclic hydrocarbons containing a vinylene bridge as exemplified by 4,8,9,10-tetrachloro-4,8-vinylene-perhydro-s-indacene are useful as flame retardant agents when composited with polymeric substrates.

14 Claims, No Drawings

HALOGEN SUBSTITUTED POLYCYCLIC HYDROCARBONS

This invention relates to novel compositions of matter comprising halo-substituted polycyclic hydrocarbons. More specifically, the invention is concerned with novel compositions of matter comprising polychloro-substituted hydrocarbons containing a vinylene bridge and to the use thereof as additives for polymeric materials whereby certain desirable physical characteristics are imparted to the polymer.

In view of the increased use of synthetic materials which include plastics, polymers, resins, as well as synthetic textiles and fibers, it is necessary, in many instances, that the aforementioned synthetic materials possess certain desirable physical characteristics. This is especially necessary when the synthetic material is to be utilized in places which may be subjected to extensive heat or to the action of a possible flame, such places including architectural panels for construction work, wall plugs for electrical connections, sound-proofing materials in walls, ceilings, etc., cushions for various vehicle seats such as airplane seats, automobile seats, bus seats, etc., paints, lacquers, varnishes, or paints, coatings, films etc. In order to effect these desirable physical characteristics, it is necessary to formulate or incorporate certain compounds into the substrate which may be a plastic, polymer, co-polymer, terpolymer, resin, polycondensate, elastomer, rubber, textile, or fiber, both naturally occurring or synthetic in nature, coating, paint, varnish, leather, synthetic foam, polyolefin, such as polyethylene and polyethylene co-polymer, polypropylene and polypropylene co-polymer, polystyrene and polystyrene co-polymer, polyvinyl acetate or alcohol or co-polymer, polyvinyl chloride and co-polymer, polyvinylidene chloride and co-polymer, polyester, polyurethane, polyvinyl ether, polycarbonate, polyamide, polyethylene oxide, polyacrylate, polymethacrylate, epoxy resin, acrylonitrile-butadiene-styrene formulation (ABS) etc.

It is therefore an object of this invention to provide novel compositions of matter which possess certain desirable physical characteristics.

A further object of this invention is to provide novel compositions of matter which possess desirable flame retardent properties and which may be incorporated in various polymeric substrates.

In one aspect an embodiment of this invention resides in a halo-substituted polycyclic compound having the formula:

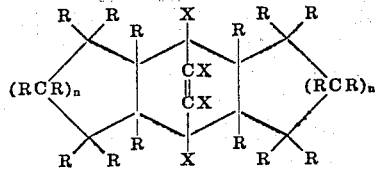

in which X is hydrogen or halogen, at least 1 X being halogen, R is hydrogen or an alkyl of from one to four carbon atoms and n is an integer of from 1 to 10.

Another embodiment of this invention is found in a process for the preparation of a halo-substituted polycyclic compound containing a vinylene bridge which comprises reacting a halo-substituted pentadienoic acid with a cycloalkene at reaction conditions, and recovering the resultant compound.

A specific embodiment of this invention resides in the compound 4,8,9,10-tetrachloro-4,8-vinylene-perhydro-s-indacene.

Another specific embodiment of this invention is found in a process for the preparation of a halo-substituted polycyclic compound containing a vinylene bridge which comprises reacting pentachloro-2,4-pentadienoic acid with cyclopentene at a temperature in the range of from 50° to 300°C. and a pressure in the range of from about atmospheric to about 100 atmospheres and recovering the resultant 4,8,9,10-tetrachloro-4,8-vinylene-perhydro-s-indacene.

As hereinbefore set forth the present invention is concerned with novel compositions of matter and to a method for the preparation thereof, said novel compositions of matter comrpising halogen-substituted polycyclic hydrocarbons containing a vinylene bridge. These novel compositions of matter possess the generic formula:

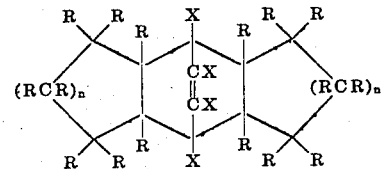

in which X is halogen or hydrogen, at least 1 X being halogen, R is hydrogen or an alkyl radical of from one to about four carbon atoms and n is an integer of from 1 to about 10. These compounds are prepared by reacting a halo-substituted pentadienoic acid containing at least two halogen atoms with a cycloalkene under reaction conditions which include elevated temperatures ranging from about 50° to about 300°C., preferably in a range of about 150° to about 250°C. and at pressures ranging from atmospheric up to about 100 atmospheres or more, the superatmospheric pressures being that of the reactants or being provided for by the introduction of a substantially inert gas such as nitrogen into the reaction zone. In addition, another reaction condition will include the presence of an excess of the cycloalkene over the halo-substituted pentadienoic acid, said cycloalkene being present in a mole ratio of from about 2:1 up to about 5:1 or more moles of cycloalkene per mole of acid.

Examples of halo-substituted pentadienoic acids which are characterized by containing at least two halogen atoms will include those in which the halogen atom is preferably chlorine or bromine, although it is also contemplated within the scope of this invention that fluoro-or iodo-substituted pentadienoic acids may also be used. Some specific examples of these will include 4,5-dichloro-2,4-pentadienoic acids, 2,5-dichloro-2,4-pentadienoic acids, 3,5-dichloro-2,4-pentadienoic acids, 2,3,5-trichloro-2,4-pentadienoic acids, 2,3,4,5,-tetrachloro-2,4-pentadienoic acids, pentachloro-2,4-pentadienoic acids, 4,5-dibromo-2,4-pentadienoic acids, 2,5-dibromo-2,4-pentadienoic acids, 3,5-dibromo-2,4-pentadienoic acids, 2,3,5-tribromo-2,4,-pentadienoic acids, 2,3,4,5-tetrabromo-2,4-pentadienoic acids, pentabromo-2,4-pentadienoic acids, pentafluoropentadienoic acid, 4,5-di-iodo-2,4-pentadienoic acids, 2,5-diiodo-2,4-pentadienoic acids, 3,5-diiodo-2,4-pentadienoic acids, 2,3,5-triiodo-2,4-pentadienoic acids, 2,3,4,5-tetraiodo-2,4-pentadienoic acids, pentaiodo-2,4-pentadienoic acids, etc.

The cycloalkenes which may be reacted with the aforementioned pentadienoic acids will contain from about 5 up to about 14 carbon atoms in the ring, the rings being, if so desired, substituted with alkyl groups containing from about one to about four carbon atoms, said alkyl groups preferably being primary in nature. Some specific examples of these cycloalkenes will include cyclopentene, cyclohexene, cycloheptene, cyclooctene, cyclononene, cyclodecene, cycloundecene, cyclododecene, cyclotridecene, cyclotetradecene, the isomeric methylcyclopentenes, dimethylcyclopentenes, trimethylcyclopentenes, tetramethylcyclopentenes, pentamethylcyclopentenes, etc., ethylcyclopentenes, diethylcyclopentenes, triethylcyclopentenes, tetraethylcyclopentenes, hexaethylcyclopentenes, etc., propylcyclopentenes, dipropylcyclopentenes, tripropylcyclopentenes, tetrapropylcyclopentenes, pentapropylcyclopentenes, etc., butylcyclopentenes, dibutylcyclopentenes, tributylcyclopentenes, tetrabutylcyclopentenes, etc., methylcyclohexenes, dimethylcyclohexenes, trimethylcyclohexenes, tetramethylcyclohexenes, octamethylcyclohexenes, etc., ethylcyclohexenes, diethylcyclohexenes, triethylcyclohexenes, tetraethylcyclohexenes, hexaethylcyclohexenes, etc., propylcyclohexenes, dipropylcyclohexenes, tripropylcyclohexenes, tetrapropylcyclohexenes, etc. butylcyclohexenes, dibutylcyclohexenes, tributylcyclohexenes, tetrabutylcyclohexenes, etc., methylcycloheptenes, dimethylcycloheptenes, trimethylcycloheptenes, tetramethylcycloheptenes, etc., ethylcycloheptenes, diethylcycloheptenes, triethylcycloheptenes, tetraethylcycloheptenes, etc., propylcycloheptenes, dipropylcycloheptenes, tripropylcycloheptenes, tetrapropylcycloheptenes, etc., butylcycloheptenes, dibutylcycloheptenes, tributylcycloheptenes, tetrabutylcycloheptenes, etc., the corresponding methyl-, ethyl-, propyl-, and butyl-substituted cyclooctenes, cyclononenes, cyclodecenes, cycloundecenes, cyclododecenes, cyclotridescenes, cyclotetradecenes, 1,2- and 1,4-dihydronaphthalenes, etc. It is to be understood that the aforementioned cycloalkenes and alkyl-substituted cycloalkenes are only representative of the class which may be used, that the present invention is not necessarily limited thereto.

The process of this invention may be effected in any suitable manner and may comprise a batch or continuous type operation. For example, when a batch type operation is used, a quantity of the reactants comprising the halo-substituted pentadienoic acid and the cycloalkene is placed in an appropriate apparatus. This apparatus may comprise a reaction flask or, if superatmospheric pressures are to be employed, an autoclave of the rotating or mixing type. In addition, if so desired, a substantially inert organic solvent such as n-pentane, n-hexane, methylcyclopentane, methylcyclohexane, benzene, toluene, the xylenes, etc., may also be utilized. The reaction apparatus is then sealed and, if desired, a substantially inert gas such as nitrogen is pressed in until the desired pressure is reached. Following this, the apparatus and the contents thereof are heated to the desired operating temperature which is in a range hereinbefore set forth in greater detail. The desired operating conditions of temperature and pressure are maintained for a predetermined residence time which may range from 0.1 up to about 10 hours or more in duration. At the end of this time, heating is discontinued and the apparatus allowed to return to room temperature. The excess pressure, if any, is discharged, the apparatus is opened and the reaction mixture is recovered therefrom. The reaction mixture is then subjected to conventional means of purification and separation, said means including filtration, extraction, washing, drying, and fractional distillation or crystallization whereby the desired novel composition of matter is recovered therefrom.

It is contemplated that the novel composition of matter of the present invention may also be prepared by utilizing a continuous manner of operation. When such a type of operation is utilized, the starting materials comprising the halo-substituted pentadienoic acid and the cycloalkene are continuously charged to a reaction zone which is maintained at the proper operating conditions of temperature and pressure.

In addition, if a solvent is to be employed, it may also be charged through a separate line, or if so desired, it may be admixed with one or both of the starting materials prior to entry into said reactor and the resulting solution charged thereto through a single line. Upon completion of the desired residence time, the reactor effluent is continuously withdrawn and subjected to conventional steps of separation whereby the desired novel composition of matter is separated from any unreacted starting material and/or undesired side reaction products which may have been formed, the unreacted starting material being recycled to the reactor to form a portion of the feed stock.

Some specific examples of the novel compositions of matter of the present invention will include 4,8,9,10-tetra-chloro-4,8-vinylene-perhydro-s-indacene, 5,10,1-1,12-tetrachloro-5,10-vinylene-perhydroanthracene, 6,13,15,16-tetrachloro-6,13-vinylene-5,6,7,12,13,14-hexahydropentacene, 1,4-dichloro-1,4-(1,2-dichlorovinylene)-2,3:5,6-bispentamethylenecyclohexane, and 1,4-dichloro-1,4-(1,2-dichlorovinylene)-2,3:5,6-bismethylenecyclohexane.

As hereinbefore set forth the novel compositions of matter may be composited with polymeric substrates to prepare finished compositions of matter which will be retardant to flames. The flame retardant novel compositions of matter will usually be present in the finished compound in an amount ranging from about 5 percent up to about 50 percent by weight of the composite. Some specific examples of these composites will include 4,8,9,10-tetrachloro-4,8-vinylene-perhydro-s-indacene and polypropylene, 4,8,9,-10-tetrachloro-4,8-vinylene-perhydro-s-indacene and polyethylene, 4,8,9,-10-tetrachloro-4,8-vinylene-perhydro-s-indacene and poly-styrenes, 4,8,9,10-tetrachloro-4,8-vinylene-perhydro-s-indacene and ABS, 4,8,9,10-tetrachloro-4,8-vinylene-perhydro-s-indacene and polyvinyl chloride, 4,8,9,10-tetrachloro-4,8-vinylene-perhydro-s-indacene and epoxy resins, 5,10,11,12-tetrachloro-5,10-vinylene-perhydroanthracene and polypropylene, 5,10-,11,12-tetrachloro-5,10-vinylene-perhydroanthracene and polyethylene, 5,10,11,-12-tetrachloro-5,10-vinylene-perhydroanthracene and polystyrene, 5,10,1-1,12-tetrachloro-5,10-vinylene-perhydroanthracene and ABS, 5,10,11,12-tetrachloro-5,10-vinylene-perhydroanthracene and polyvinyl chloride, 5,10,11,12-tetrachloro-5,10-vinylene-perhydroanthracene and epoxy resins, etc. It is to be understood that the aforementioned composites of novel compositions of matter of the present invention are only representative of the type of composites which may be formed, and that the present invention is not necessarily limited thereto.

The following examples are given to illustrate the novel compositions of matter of the present invention and the process for the preparation thereof; however, these examples are not intended to limit the generally broad scope of the present invention in strict accordance therewith.

EXAMPLE I

In this example a mixture of 15 g. (0.06 mole) of pentachloro-2,4-pentadienoic acid and 24 g. (0.35mole) of cyclopenetene was placed in the glass liner of a rotating autoclave. The liner was sealed into the autoclave and nitrogen pressed in until an initial pressure of 30 atmospheres was reached. The autoclave was then heated to a temperature of 225°C. and maintained thereat for a period of 4 hours, the maximum pressure during this time rising to 85 atmospheres. At the end of this time period, heating was discontinued and the autoclave allowed to return to room temperature, the final pressure at room temperature being 30 atmospheres. The excess pressure was discharged and the autoclave was opened, there being obtained 23 g. of a dark liquid and crystals. Filtration of the mixture yielded 6 g. of black crystals which were extracted and recovered as yellowish rhombs upon recrystallization from hot ethanol, said crystals having a melting point of 156°–157°. The crystals, which comprised 4,8,9,10-tetrachloro-4,8-vinylene-perhydro-s-indacene were subjected to anlaysis with the following results: Calculated for: $C_{14}H_{16}Cl_4$; C,51.56; H,4.95 Cl,43.49

Found: C,51.61; H,4.86; Cl,43.0

EXAMPLE II

In this example a mixture of 21 g. of pentachloro-2,4-pentadienoic acid and 32 g. of cyclohexene along with 35 g. of toluene is placed in the glass liner of a rotating autoclave. The liner is then sealed into the autoclave and nitrogen pressed in until an initial pressure of 35 atmospheres is reached. The autoclave is then heated to a temperature of 225°C. and maintained thereat for a period of 4 hours, the maximum pressure during this time reaching about 75 atmospheres. At the end of the aforementioned time period, heating is discontinued, the autoclave is allowed to return to room temperature, the final pressure at room temperature being 30 atmospheres, and the excess pressure is discharged. The autoclave is opened and the reaction mixture recovered therefrom. After extraction was an alkali, the insoluble material is subjected to fractional distillation to remove unreacted starting materials and solvent. The residue is recrystallized from alcohol to yield the desired product, namely, 5,10,11,12-tetrachloro-5,10-vinylene-perhydroanthracene.

EXAMPLE III

A mixture comprising 0.05 mole of pentachloro-2,4-pentadienoic acid, 0.35 mole of cycloheptene and 35 g. of toluene is placed in the glass liner of a rotating autoclave which is thereafter sealed into said autoclave and nitrogen pressed in until an initial pressure of 30 atmospheres is reached. The autoclave is then heated to a temperature of 250°C. and maintained thereat for a period of 4 hours, the maximum pressure during this time rising to approximately 75 atmospheres. At the end of the 4 hour period, heating is discontinued and the autoclave and contents thereof are allowed to return to room temperature and the excess pressure is discharged. The autoclave is then opened and the reaction mixture recovered therefrom. The mixture is then treated in a manner similar to that set forth in the above examples whereby the desired product comprising 1,4-dichloro-1,4(1,2-dichlorovinylene)-2,3:5,6-bispentamethylenecyclohexane is recovered therefrom.

EXAMPLE IV

In like manner material consisting of 0.05 mole of pentachloro-2,4-pentadienoic acid, 0.4 mole of cyclooctene and 50 g. of benzene are heated to a temperature of 250°C. in a rotating autoclave under 30 atmospheres of nitrogen for a period of 4 hours. At the end of the 4 hour time period, heating of the autoclave is discontinued and the apparatus allowed to return to room temperature. The excess pressure is discharged, the autoclave is opened and the reaction mixture is recovered therefrom. After extraction with dilute alkali and distillation to remove unreacted starting materials and solvents, the residue is recrystallized from alcohol. These crystals comprise the desired product, namely, 1,4-dichloro-1,4-(1,2-dichlorovinylene)- 2,3:5,6-bishexamethylenecyclohexane.

EXAMPLE V

In this example, a mixture of 0.05 mole of pentachloro-2,4-pentadienoic acid, 0.4 mole of 1,4-dihydronaphthalene and 50 g. of toluene is placed in the glass liner of a rotating autoclave. The liner is then sealed into the autoclave and nitrogen pressed in until an initial pressure of 30 atmospheres is reached. Following this, the autoclave is heated to a temperature of 250°C. and maintained thereat for a reaction period of 4 hours, the maximum pressure during this time reaching approximately 75 atmospheres. At the end of the 4 hour period, heating is discontinued and the autoclave allowed to return to room temperature, the final pressure at room temperature dropping to 30 atmospheres. This excess pressure is discharged, the autoclave is opened and the reaction mixture is recovered therefrom. The mixture is treated in a manner similar to that set forth in the above examples, that is, by extraction by a dilute alkali distillation to remove unreacted starting materials and solvents and the residue allowed to crystallize. This reaction is recrystallized from an alcohol to recover the desired product consisting of 6,13,1-5,16-tetrachloro-6,13-vinylene-5,6,7,12,13,14-hexahydropentacene.

I claim as my invention:

1. A halo-substituted polycyclic compound having the formula:

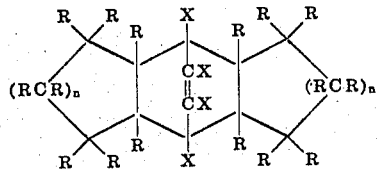

in which X is hydrogen or halogen, at least 1 X being halogen, R is hydrogen or an alkyl of from one to four carbon atoms and $n$ is an integer of from 1 to 10.

2. The compound of claim 1 in which the halogen is chlorine or bromine.

3. The compound of claim 1 being 4,8,9,10-tetrachloro-4,8-vinylene-perhydro-s-indacene.

4. The compound of claim 1 being 5,10,11,12-tetrachloro-5,10-vinylene-perhydroanthracene.

5. The compound of claim 1 being 1,4-dichloro-1,4-(1,2-dichlorovinylene)-2,3:5,6-bispentamethylenecyclohexane.

6. The compound of claim 1 being 1,4-dichloro-1,4-(1,2-dichlorovinylene)-2,3:5,6-bishexamethylenecyclohexane.

7. The compound of claim 1 being 6,13,15,16-tetrachloro-6,13-vinylene-5,6,7,12,13,14-hexahydropentacene.

8. The process as set forth in claim 14 in which said acid is pentachloro-2,4-pentadienoic acid.

9. The process as set forth in claim 8 in which said cycloalkene is cyclopentene and said compound is 4,8,9,10-tetrachloro-4,8-vinylene-perhydro-s-indacene.

10. The process as set forth in claim 8 in which said cycloalkene is cyclohexene and said compound is 5,10,11,12-tetrachloro-5,10-vinylene-perhydroanthracene.

11. The process as set forth in claim 8 in which said cycloalkene is cycloheptene and said compound is 1,4-dichloro-1,4-(1,2-dichlorovinylene)-2,3:5,6-bis-pentamethylenecyclohexane.

12. The process as set forth in claim 8 in which said cycloalkene is cyclooctene and said compound is 1,4-dichloro-1,4-(1,2-dichlorovinylene)-2,3:5,6-bishexamethylenecyclohexane.

13. The process as set forth in claim 8 in which said cycloalkene is 1,4-dihydronaphthalene and said compound is 6,13,15,16-tetrachloro-6,13-vinylene-5,6,7,12,13,14-hexahydropentacene.

14. A process which comprises reacting a halo-substituted 2,4-pentadienoic acid with a cycloalkene at a temperature of from about 50° to about 300°C. and a pressure of from about atmospheric to about 100 atmospheres, the cycloalkene being present in a mole ratio of from about 2:1 up to about 5:1 or more moles per mole of said acid, and recovering the resultant compound.

* * * * *